(12) United States Patent
Hung

(10) Patent No.: US 11,378,867 B2
(45) Date of Patent: Jul. 5, 2022

(54) PORTABLE ELECTRONIC DEVICE AND MOVABLE LENS-SHUTTING MODULE THEREOF

(71) Applicant: AZUREWAVE TECHNOLOGIES, INC., New Taipei (TW)

(72) Inventor: Chih-Jung Hung, New Taipei (TW)

(73) Assignee: AZUREWAVE TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 17/022,095

(22) Filed: Sep. 16, 2020

(65) Prior Publication Data
US 2021/0349374 A1   Nov. 11, 2021

(30) Foreign Application Priority Data
May 8, 2020  (TW) .................................. 109115342

(51) Int. Cl.
*G03B 11/04* (2021.01)
*G06F 1/16* (2006.01)
*H01F 7/08* (2006.01)

(52) U.S. Cl.
CPC .......... *G03B 11/043* (2013.01); *G06F 1/1686* (2013.01); *H01F 7/081* (2013.01); *H01F 2007/086* (2013.01)

(58) Field of Classification Search
CPC ............... G03B 9/08; G03B 9/14; G03B 9/36
See application file for complete search history.

(56) References Cited

U.S. PATENT DOCUMENTS

2005/0174009 A1 * 8/2005 Kayama ................. G02B 7/102
                                                        310/156.26
2020/0249415 A1 * 8/2020 Wang ..................... G02B 7/023

* cited by examiner

*Primary Examiner* — Noam Reisner
(74) *Attorney, Agent, or Firm* — Li & Cai Intellectual Property Office

(57) ABSTRACT

A portable electronic device and a movable lens-shutting module thereof are provided. The movable lens-shutting module includes a magnetic field generator, a rotatable driving assembly and a movable shutter assembly. The rotatable driving assembly includes a rotatable magnetic element and a rotatable driving element fixed on the rotatable magnetic element. The rotatable driving element includes at least one driving rod. The movable shutter assembly includes at least one shutter element. The shutter element includes a lens opening corresponding to a lens and a receiving groove for receiving the driving rod. When the rotatable magnetic element and the rotatable driving element are concurrently moved by a magnetic force generated by the magnetic field generator, the shutter element is moved in a linear direction by moving the driving rod, so that the lens is exposed by the lens opening or is blocked by the shutter element.

10 Claims, 11 Drawing Sheets

PORTABLE ELECTRONIC DEVICE AND MOVABLE LENS-SHUTTING MODULE THEREOF

CROSS-REFERENCE TO RELATED PATENT APPLICATION

This application claims the benefit of priority to Taiwan Patent Application No. 109115342, filed on May 8, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a portable electronic device and a movable lens-shutting module thereof, and more particularly to a portable electronic device and a movable lens-shutting module thereof using a shutter to selectively expose or shade a lens.

BACKGROUND OF THE DISCLOSURE

In the related art, a lens that is equipped on a notebook computer is continuously exposed and cannot be blocked (or be shielded), so that it can be dangerous in terms of privacy for a user using the notebook computer for an extended period of time.

SUMMARY OF THE DISCLOSURE

In response to the above-referenced technical inadequacies, the present disclosure provides a movable lens-shutting module, including a magnetic field generator, a rotatable driving assembly and a movable shutter assembly. The rotatable driving assembly includes a rotatable magnetic element adjacent to the magnetic field generator and a rotatable driving element fixed on the rotatable magnetic element, and the rotatable driving element includes a first driving rod and a second driving rod. The movable shutter assembly includes a first shutter element and a second shutter element overlapping with each other. The first shutter element includes a first lens opening corresponding to a lens and a first receiving groove for receiving the first driving rod, and the second shutter element includes a second lens opening corresponding to the first lens opening and a second receiving groove for receiving the second driving rod. When the rotatable magnetic element and the rotatable driving element are concurrently moved by a magnetic force generated by the magnetic field generator, the first shutter element and the second shutter element are respectively moved in two different directions by respectively moving the first driving rod and the second driving rod, so that the first lens opening and the second lens opening are in a strictly overlapping relationship with each other so as to expose the lens by the first lens opening and the second lens opening, or the first lens opening and the second lens opening are not in a strictly overlapping relationship with each other so as to cover the lens by the movable shutter assembly.

In another aspect, the present disclosure provides a movable lens-shutting module, including a magnetic field generator, a rotatable driving assembly and a movable shutter assembly. The rotatable driving assembly includes a rotatable magnetic element adjacent to the magnetic field generator and a rotatable driving element fixed on the rotatable magnetic element, and the rotatable driving element includes at least one driving rod. The movable shutter assembly includes at least one shutter element, and the at least one shutter element includes a lens opening corresponding to a lens and a receiving groove for receiving the at least one driving rod. When the rotatable magnetic element and the rotatable driving element are concurrently moved by a magnetic force generated by the magnetic field generator, the at least one shutter element is moved in a linear direction by moving the at least one driving rod, so that the lens is exposed by the lens opening or is blocked by the at least one shutter element.

In yet another aspect, the present disclosure provides a portable electronic device including an image-capturing assembly that includes an image-capturing module and a movable lens-shutting module, and the image-capturing module includes a lens mated with the movable lens-shutting module. The movable lens-shutting module includes a magnetic field generator, a rotatable driving assembly and a movable shutter assembly. The rotatable driving assembly including a rotatable magnetic element adjacent to the magnetic field generator and a rotatable driving element fixed on the rotatable magnetic element, and the rotatable driving element includes a first driving rod and a second driving rod. The movable shutter assembly includes a first shutter element and a second shutter element overlapping with each other. The first shutter element includes a first lens opening corresponding to the lens and a first receiving groove for receiving the first driving rod, and the second shutter element includes a second lens opening corresponding to the first lens opening and a second receiving groove for receiving the second driving rod. When the rotatable magnetic element and the rotatable driving element are concurrently moved by a magnetic force generated by the magnetic field generator, the first shutter element and the second shutter element are respectively moved in two different directions by respectively moving the first driving rod and the second driving rod, so that the first lens opening and the second lens opening are in a strictly overlapping relationship with each other so as to expose the lens by the first lens opening and the second lens opening, or so that the first lens opening and the second lens opening are not in a strictly overlapping relationship with each other so as to cover the lens by the movable shutter assembly.

Therefore, by virtue of "the rotatable driving assembly including a rotatable magnetic element adjacent to the magnetic field generator and a rotatable driving element fixed on the rotatable magnetic element, and the rotatable driving element including at least one driving rod (such as including a first driving rod and a second driving rod" and "the movable shutter assembly including at least one shutter element (such as including a first shutter element and a second shutter element), and the at least one shutter element including a lens opening corresponding to a lens and a receiving groove for receiving the at least one driving rod (for example, the first shutter element includes a first lens opening corresponding to the lens and a first receiving groove for receiving the first driving rod, and the second shutter element includes a second lens opening corresponding to the first lens opening and a second receiving groove for receiving the second driving rod)", when the rotatable magnetic element and the rotatable driving element are concurrently moved by a magnetic force generated by the magnetic field generator, the at least one shutter element is moved in a linear direction by moving the at least one driving rod, so that the lens can be exposed by the lens opening or can be blocked by the at least one shutter element (for example, the first shutter element and the second shutter element can be respectively moved in two different directions by respectively moving the first driving rod and the second driving rod, so that the first lens opening and the second lens opening are in a strictly overlapping relationship with each other so as to expose the lens by the first lens opening and the second lens opening, or so that the first lens opening and the second lens opening are not in a strictly overlapping relationship with each other so as to cover the lens by the movable shutter assembly).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
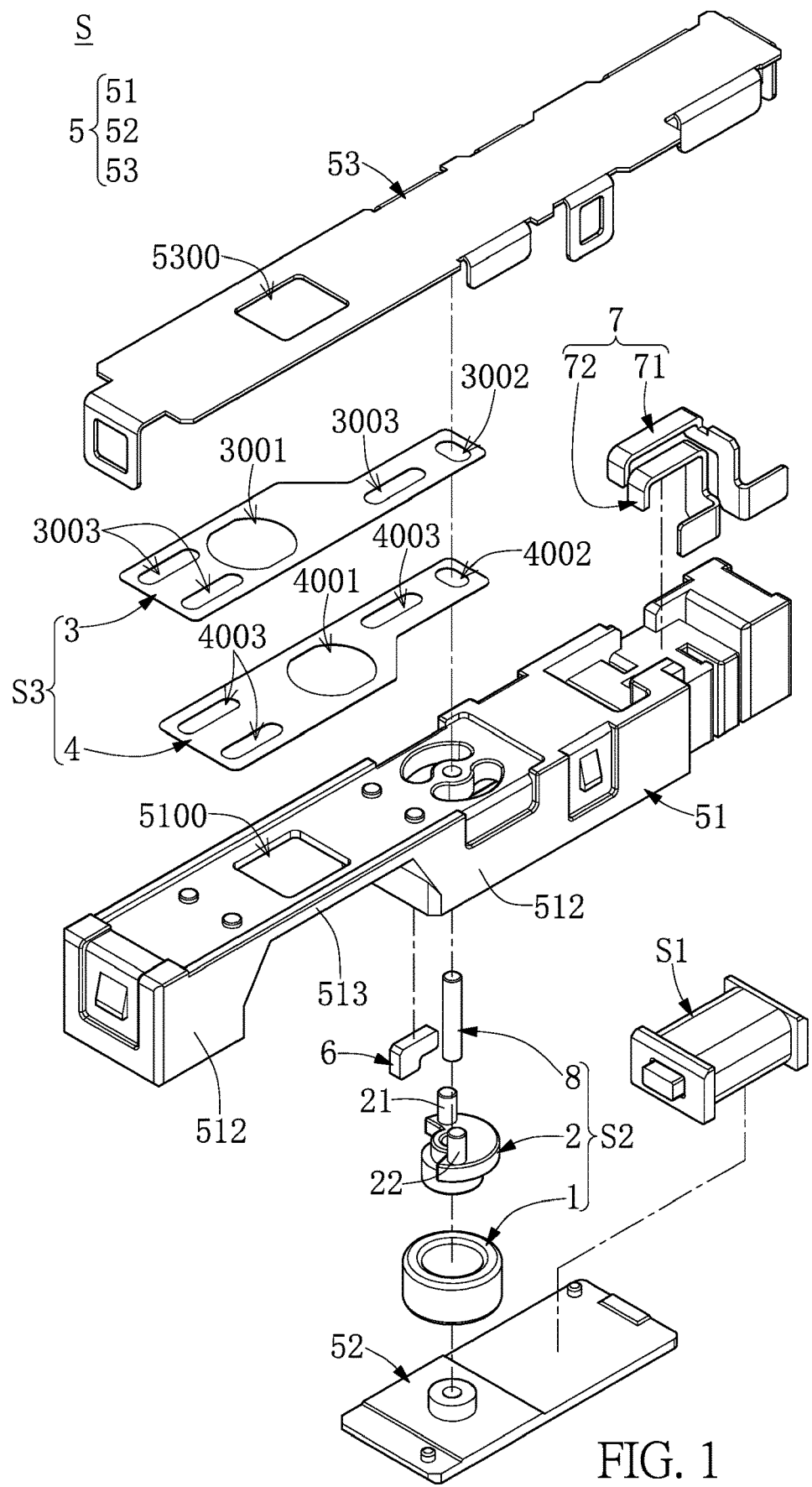
FIG. 1 is an exploded schematic view of a movable lens-shutting module according to the present disclosure.
Figure 2:
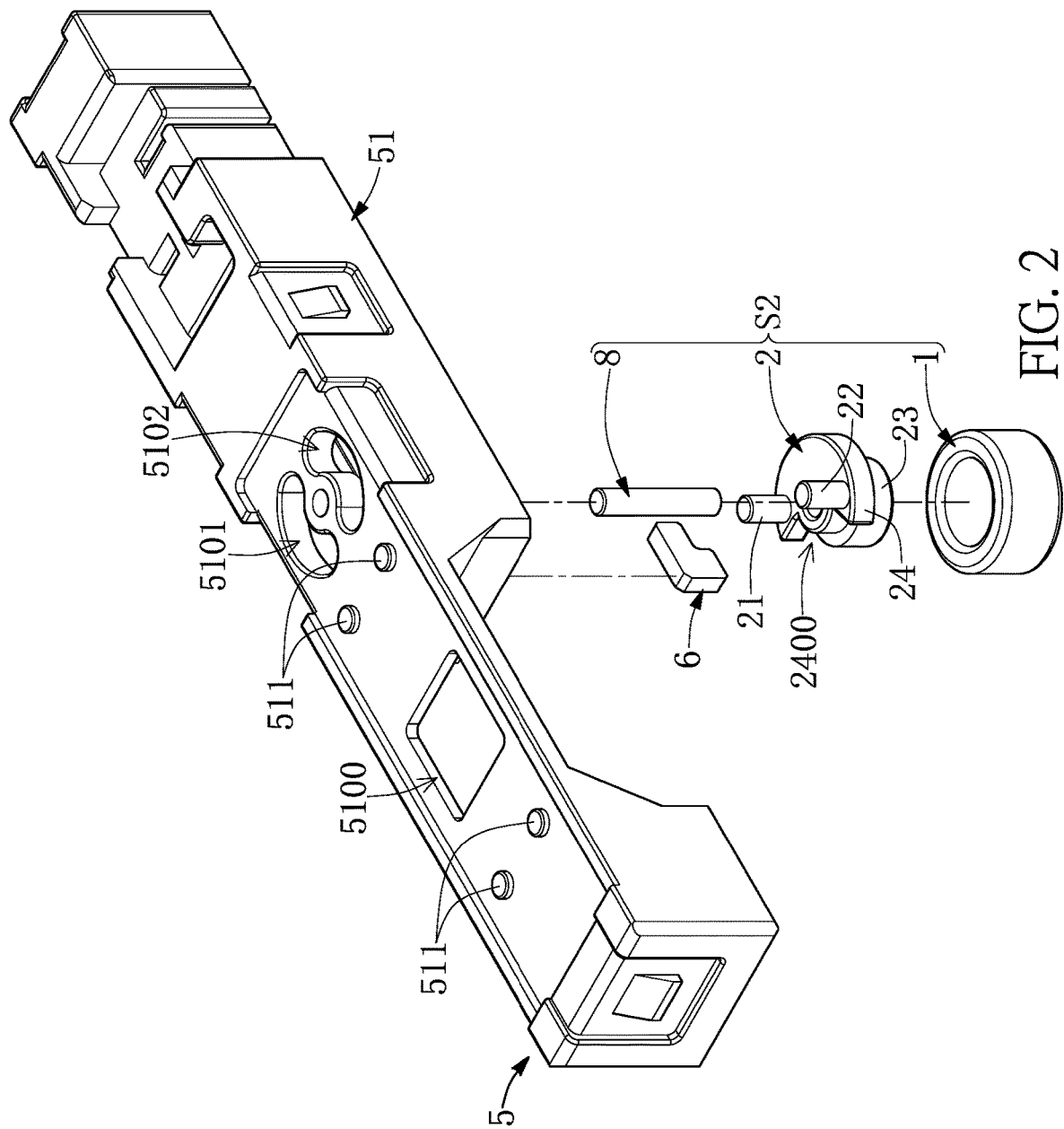
FIG. 2 is a partial exploded schematic view of the movable lens-shutting module according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 10, the present disclosure provides a movable lens-shutting module S, including a magnetic field generator S1, a rotatable driving assembly S2 and a movable shutter assembly S3.

Firstly, referring to FIG. 1, FIG. 2, FIG. 4 and FIG. 5, the rotatable driving assembly S2 includes a rotatable magnetic element 1 adjacent to the magnetic field generator S1 and a rotatable driving element 2 fixed on the rotatable magnetic element 1, and the rotatable driving element 2 includes a first driving rod 21 and a second driving rod 22. For example, the rotatable driving element 2 includes a matching portion 23 disposed inside the rotatable magnetic element 1 for matching with the rotatable magnetic element 1 and a position-limiting portion 24 disposed on the matching portion 23, and both the first driving rod 21 and the second driving rod 22 are disposed on the position-limiting portion 24. It should be noted that the position-limiting portion 24 has a curved guiding groove 2400 formed on a perimeter thereof. However, the aforementioned description is merely an example and is not meant to limit the scope of the present disclosure.

Moreover, referring to FIG. 1, FIG. 2, FIG. 4, FIG. 5, FIG. 7 and FIG. 10, the movable shutter assembly S3 includes a first shutter element 3 and a second shutter element 4 overlapping with each other. More particularly, the first shutter element 3 includes a first lens opening 3001 corresponding to a lens L and a first receiving groove 3002 for receiving the first driving rod 21, and the second shutter element 4 includes a second lens opening 4001 corresponding to the first lens opening 3001 and a second receiving groove 4002 for receiving the second driving rod 22. For example, the first receiving groove 3002 has a long strip space, so that the first driving rod 21 can be straightly moved in the first receiving groove 3002, and the second receiving groove 4002 has a long strip space, so that the second driving rod 22 can be straightly moved in the second receiving groove 4002. In addition, the first shutter element 3 has a plurality of first linear guiding grooves 3003, and the second shutter element 4 has a plurality of second linear guiding grooves 4003. It should be noted that the first shutter element 3 is shown as a long strip shape, and the first shutter element 3 has a top notch separated from the first driving rod 21 so as to avoid contact with the first driving rod 21. The second shutter element 4 is shown as a long strip shape, and the second shutter element 4 has a bottom notch separated from the second driving rod 22 so as to avoid contact with the second driving rod 22. However, the aforementioned description is merely an example and is not meant to limit the scope of the present disclosure.

For example, referring to FIG. 1 to FIG. 6 and FIG. 10, the movable lens-shutting module S of the present disclosure further includes a casing structure 5. More particularly, the casing structure 5 includes a base body 51, a bottom cover 52 detachably disposed on a bottom side of the base body 51, and a top cover 53 detachably disposed on a top side of the base body 51. In addition, the base body 51 includes a base opening 5100 corresponding to the lens L, and the top cover 53 includes a cover opening 5300 corresponding to the base opening 5100. However, the aforementioned description is merely an example and is not meant to limit the scope of the present disclosure.

For example, referring to FIG. 1 to FIG. 6, the magnetic field generator S1 and the rotatable driving assembly S2 are disposed inside the base body 51 and completely covered (blocked, shaded or shielded) by the bottom cover 52, and the movable shutter assembly S3 is disposed on the top side of the base body 51 and partially covered (blocked) by the top cover 53. Moreover, the base body 51 includes a plurality of guiding pins 511 disposed on the top side of the base body 51, and each of the guiding pins 511 concurrently passes through both the first linear guiding groove 3003 and the second linear guiding groove 4003, or passes through one of the first linear guiding groove 3003 and the second linear guiding groove 4003, so that the movement spaces of the first shutter element 3 and the second shutter element 4 can be limited or restricted by the guiding pins 511. In addition, the base body 51 includes a first curved guiding groove 5101 corresponding to the first receiving groove 3002 and a second curved guiding groove 5102 corresponding to the second receiving groove 4002. The first curved guiding groove 5101 and the second curved guiding groove 5102 are symmetrical with respect to each other, and the first driving rod 21 and the second driving rod 22 are respectively movably disposed inside the first curved guiding groove 5101 and the second curved guiding groove 5102, so that the movement space of the first driving rod 21 and the movement space of the second driving rod 22 can be respectively limited or restricted by the first curved guiding groove 5101 and the second curved guiding groove 5102. However, the aforementioned description is merely an example and is not meant to limit the scope of the present disclosure.

For example, referring to FIG. 1 to FIG. 6, the movable lens-shutting module S of the present disclosure further includes an elastic stopper 6 or an electrode assembly 7. More particularly, the elastic stopper 6 is disposed inside the base body 51 so as to limit or restrict a rotating angle of the rotatable driving element 2 (that is to say, the curved guiding groove 2400 of the position-limiting portion 24 is movable so as to movably receive the elastic stopper 6, so that a rotating angle of the rotatable driving element 2 is limited or restricted by the elastic stopper 6). Moreover, the electrode assembly 7 is disposed on the base body 51 and partially covered (or blocked) by the top cover 53, and the electrode assembly 7 includes a first conductive pin 71 electrically connected to the magnetic field generator S1 and a second conductive pin 72 electrically connected to the magnetic field generator S1. In addition, the magnetic field generator S1 may be an electromagnet, and the magnetic field generator S1 may include a support, a ferrite core passing through the support, and a coil disposed around the support, and the first conductive pin 71 and the second conductive pin 72 are respectively electrically connected to two opposite ends of the coil of the magnetic field generator 51. However, the aforementioned description is merely an example and is not meant to limit the scope of the present disclosure.

For example, referring to FIG. 1, FIG. 2, FIG. 4 and FIG. 5, the rotatable driving assembly S2 further includes a fixed shaft 8 disposed between the base body 51 and the bottom cover 52, and two opposite end portions of the fixed shaft 8 are respectively fixed on the base body 51 and the bottom cover 52. In addition, the fixed shaft 8 can pass through the rotatable magnetic element 1 and the rotatable driving element 2, and the rotatable magnetic element 1 and the rotatable driving element 2 can be rotated relative to the fixed shaft 8 by a predetermined angle (such as 35~55° C.). However, the aforementioned description is merely an example and is not meant to limit the scope of the present disclosure.

Figure 7:
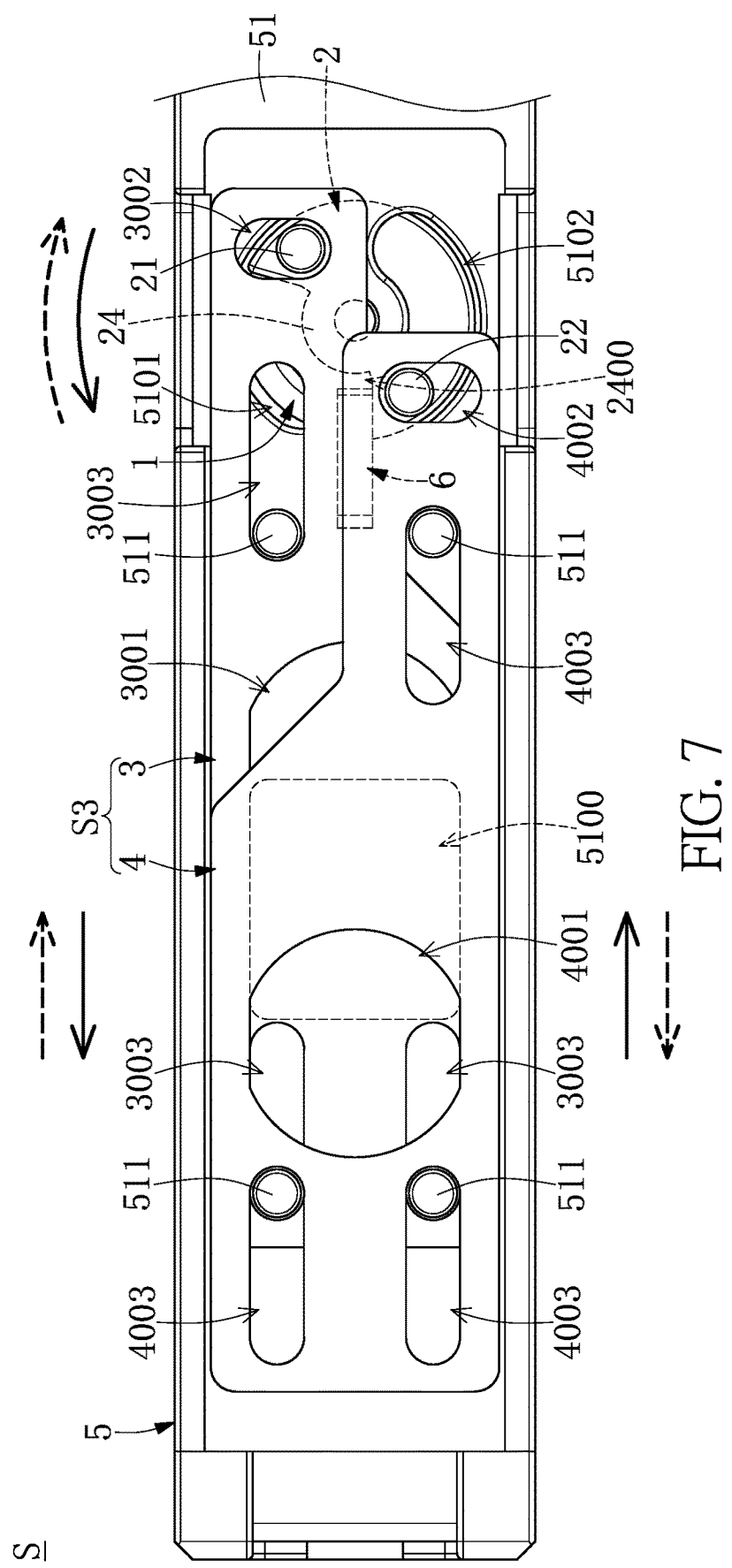
FIG. 7 is a top schematic view of a rotatable driving element of the movable lens-shutting module (with a top cover thereof being temporarily removed) prior to being counterclockwisely rotated at a predetermined angle by moving the rotatable magnetic element (or after being clockwisely rotated at the predetermined angle by moving the rotatable magnetic element) according to the present disclosure.
Figure 8:
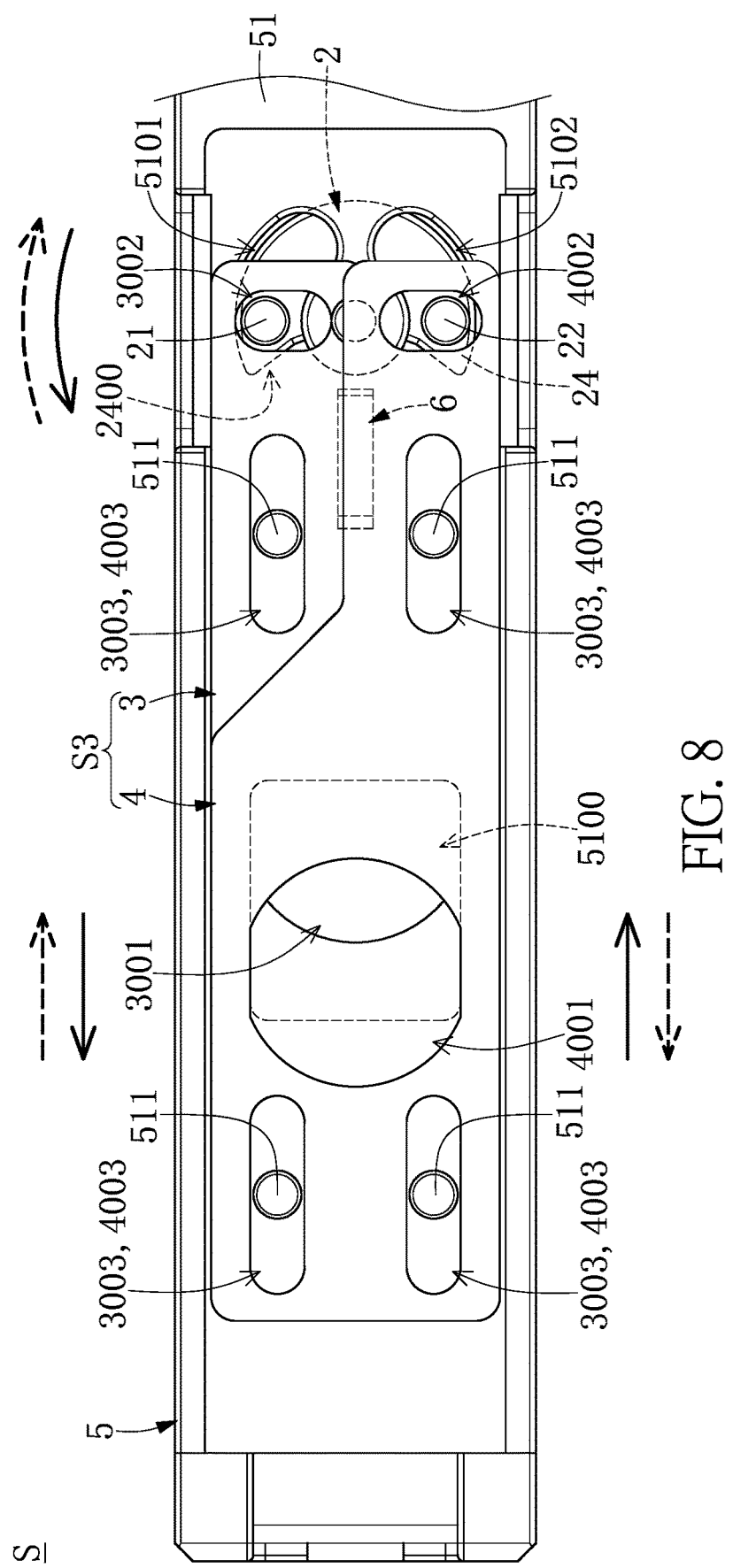
FIG. 8 is a top schematic view of the rotatable driving element of the movable lens-shutting module (with a top cover thereof being temporarily removed) being counterclockwisely rotated at the predetermined angle by moving the rotatable magnetic element (or being clockwisely rotated at the predetermined angle by moving the rotatable magnetic element) according to the present disclosure.
Figure 9:
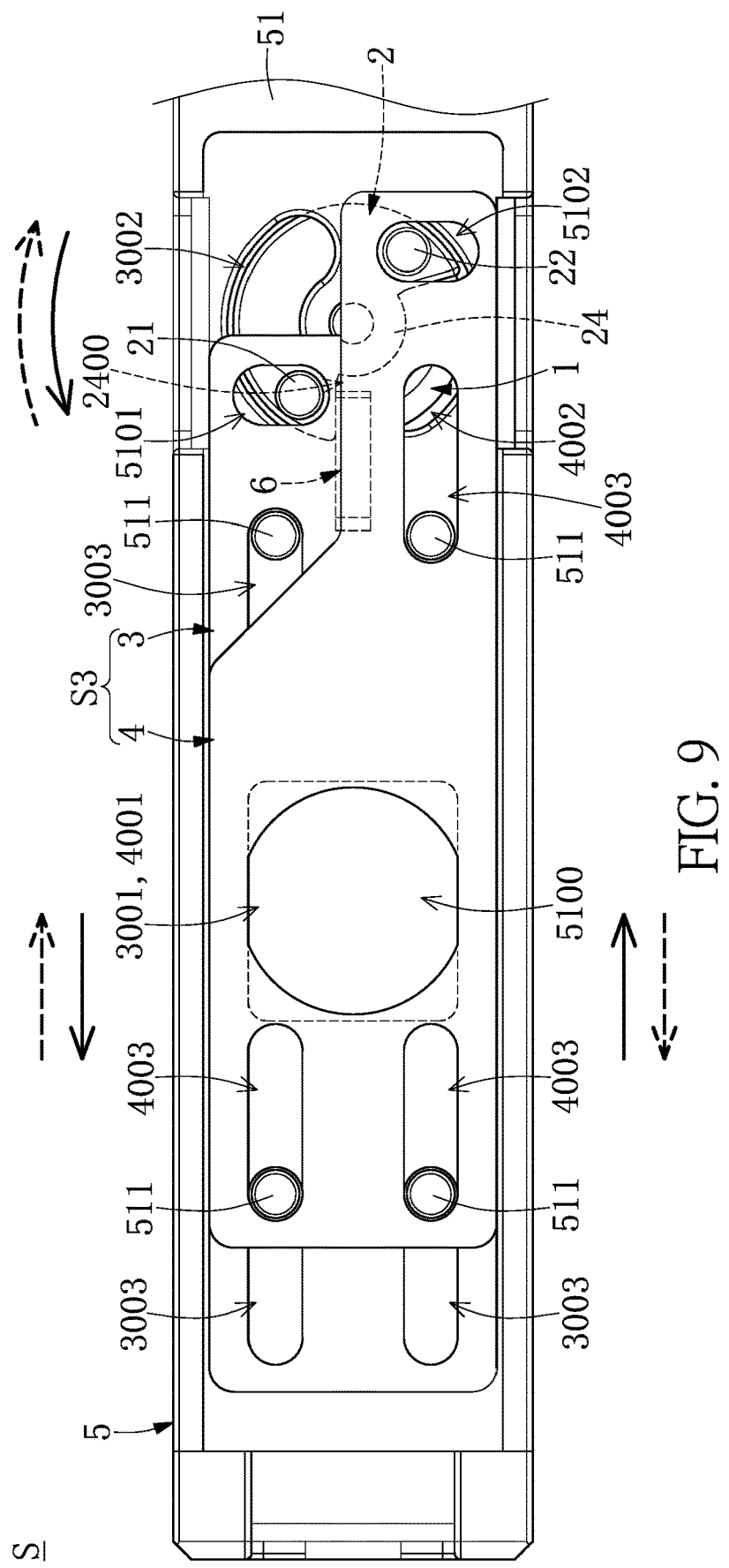
FIG. 9 is a top schematic view of the rotatable driving element of the movable lens-shutting module (with a top cover thereof being temporarily removed) after being counterclockwisely rotated at the predetermined angle by moving the rotatable magnetic element (or prior to being clockwisely rotated at the predetermined angle by moving the rotatable magnetic element) according to the present disclosure.

Therefore, referring to FIG. 7 to FIG. 10, when the rotatable magnetic element 1 and the rotatable driving element 2 are concurrently moved by a magnetic force generated by the magnetic field generator S1, the first shutter element 3 and the second shutter element 4 can be respectively moved in two different directions by respectively moving (driving) the first driving rod 21 and the second driving rod 22, so that the first lens opening 3001 and the second lens opening 4001 are in a strictly overlapping relationship with each other so as to expose the lens L (as shown in FIG. 9) by the first lens opening 3001 and the second lens opening 4001, or the first lens opening 3001 and the second lens opening 4001 are not in a strictly overlapping relationship with each other so as to cover the lens L by the movable shutter assembly S3 (as shown in FIG. 7).

Figure 10:
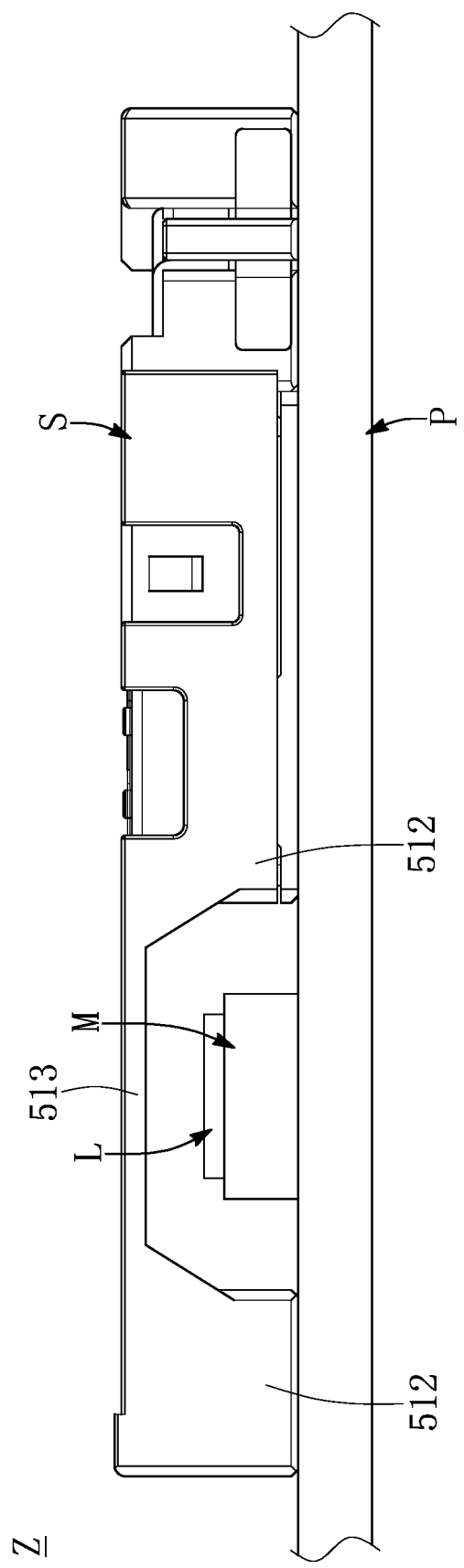
FIG. 10 is a lateral schematic view of an image-capturing assembly according to the present disclosure.

For example, referring to FIG. 7, FIG. 8 and FIG. 9 in sequence, when the rotatable magnetic element 1 is moved by a magnetic repulsion force generated by the magnetic field generator S1, the rotatable driving element 2 can be counterclockwisely rotated at a predetermined angle by moving (or driving) the rotatable magnetic element 1 (such as the counterclockwise direction of the solid arrows shown in FIG. 7 to FIG. 9), and the first shutter element 3 and the second shutter element 4 can be respectively straightly moved in two opposite directions by respectively moving (or driving) the first driving rod 21 and the second driving rod 22 (such as the right direction and the left direction of the solid arrows shown in FIG. 7 to FIG. 9) until the first lens opening 3001 of the first shutter element 3 and the second lens opening 4001 of the second shutter element 4 are in a strictly overlapping relationship with each other so as to expose the lens L (as shown in FIG. 9 and FIG. 10). It should be noted that when the rotatable driving element 2 is blocked by the elastic stopper 6 as shown in FIG. 9, the rotatable driving element 2 cannot be counterclockwisely rotated, so that the rotating angle of the rotatable driving element 2 is limited or restricted by the elastic stopper 6. However, the aforementioned description is merely an example and is not meant to limit the scope of the present disclosure.

For example, referring to FIG. 9, FIG. 8 and FIG. 7 in sequence, when the rotatable magnetic element 1 is moved by a magnetic attraction force generated by the magnetic field generator S1, the rotatable driving element 2 can be clockwisely rotated at the predetermined angle by moving (or driving) the rotatable magnetic element 1 (such as the clockwise direction of the dotted line arrows shown in FIG. 7 to FIG. 9), and the first shutter element 3 and the second shutter element 4 can be respectively straightly moved in two opposite directions by respectively moving (driving) the first driving rod 21 and the second driving rod 22 (such as the right direction and the left direction of the dotted line arrows shown in FIG. 7 to FIG. 9) until the first lens opening 3001 of the first shutter element 3 and the second lens opening 4001 of the second shutter element 4 are not in a strictly overlapping relationship with each other so as to shade the lens L by the first shutter element 3 and the second shutter element 4 (as shown in FIG. 7 and FIG. 10). It should be noted that when the rotatable driving element 2 is blocked by the elastic stopper 6 as shown in FIG. 7, the rotatable driving element 2 cannot be clockwisely rotated, so that the rotating angle of the rotatable driving element 2 is limited or restricted by the elastic stopper 6. However, the aforementioned description is merely an example and is not meant to limit the scope of the present disclosure.

For example, in another embodiment, the present disclosure provides a movable lens-shutting module S, including a magnetic field generator S1, a rotatable driving assembly S2 and a movable shutter assembly S3. The rotatable driving assembly S2 includes a rotatable magnetic element 1 adjacent to the magnetic field generator S1 and a rotatable driving element 2 fixed on the rotatable magnetic element 1, and the rotatable driving element 2 includes at least one driving rod (the quantity of the driving rod is not limited, and may be configured such that both a first driving rod 21 and a second driving rod 22 is used, or such that only one of the first driving rod 21 and the second driving rod 22 is used). The movable shutter assembly S3 includes at least one shutter element (the quantity of the shutter element is not limited, and may be configured such that both a first shutter element 3 and a second shutter element 4 is used, or such that only one of the first shutter element 3 and the second shutter element 4 is used), and the at least one shutter element includes a lens opening corresponding to a lens L and a receiving groove for receiving the at least one driving rod (for example, the first shutter element 3 including a first lens opening 3001 corresponding to the lens L and a first receiving groove 3002 for receiving the first driving rod 21, and the second shutter element 4 including a second lens opening 4001 corresponding to the first lens opening 3001 and a second receiving groove 4002 for receiving the second driving rod 22). Therefore, when the rotatable magnetic element 1 and the rotatable driving element 2 are concurrently moved by a magnetic force generated by the magnetic field generator S1, the at least one shutter element is moved in a linear direction by moving the at least one driving rod, so that the lens L can be exposed by the lens opening or can be blocked by the at least one shutter element. However, the aforementioned description is merely an example and is not meant to limit the scope of the present disclosure.

For example, when the rotatable magnetic element 1 is moved by a magnetic repulsion force generated by the magnetic field generator S1, the rotatable driving element 2 can be counterclockwisely rotated at a predetermined angle by moving (or driving) the rotatable magnetic element 1, and the at least one shutter element can be straightly moved in the linear direction by moving the at least one driving rod until the lens L is exposed by the lens opening of the at least one shutter element. In addition, when the rotatable magnetic element 1 is moved by a magnetic attraction force generated by the magnetic field generator S1, the rotatable driving element can be clockwisely rotated at the predetermined angle by moving (or driving) the rotatable magnetic element 1, and the at least one shutter element can be straightly moved in the linear direction by moving the at least one driving rod until the lens L is blocked by the at least one shutter element. However, the aforementioned description is merely an example and is not meant to limit the scope of the present disclosure.

Figure 3:
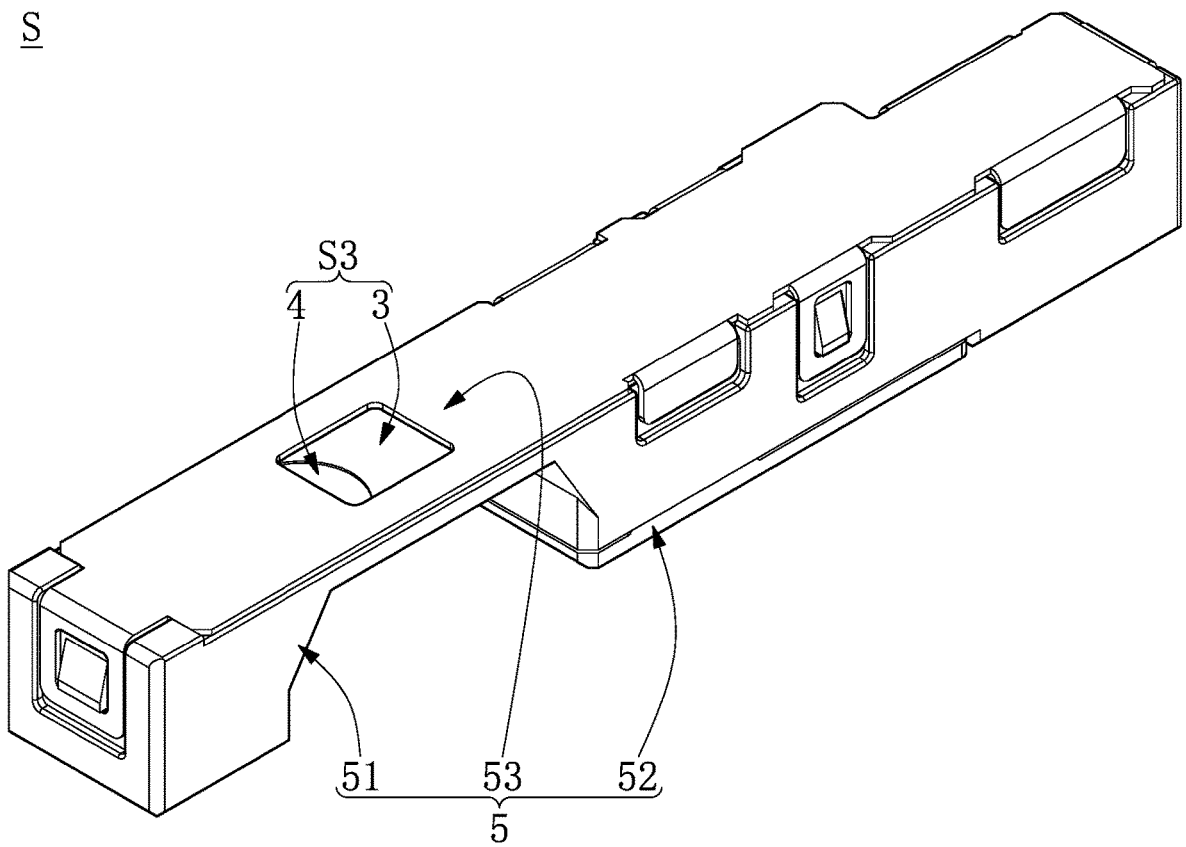
FIG. 3 is an assembled schematic view of the movable lens-shutting module according to the present disclosure.
Figure 4:
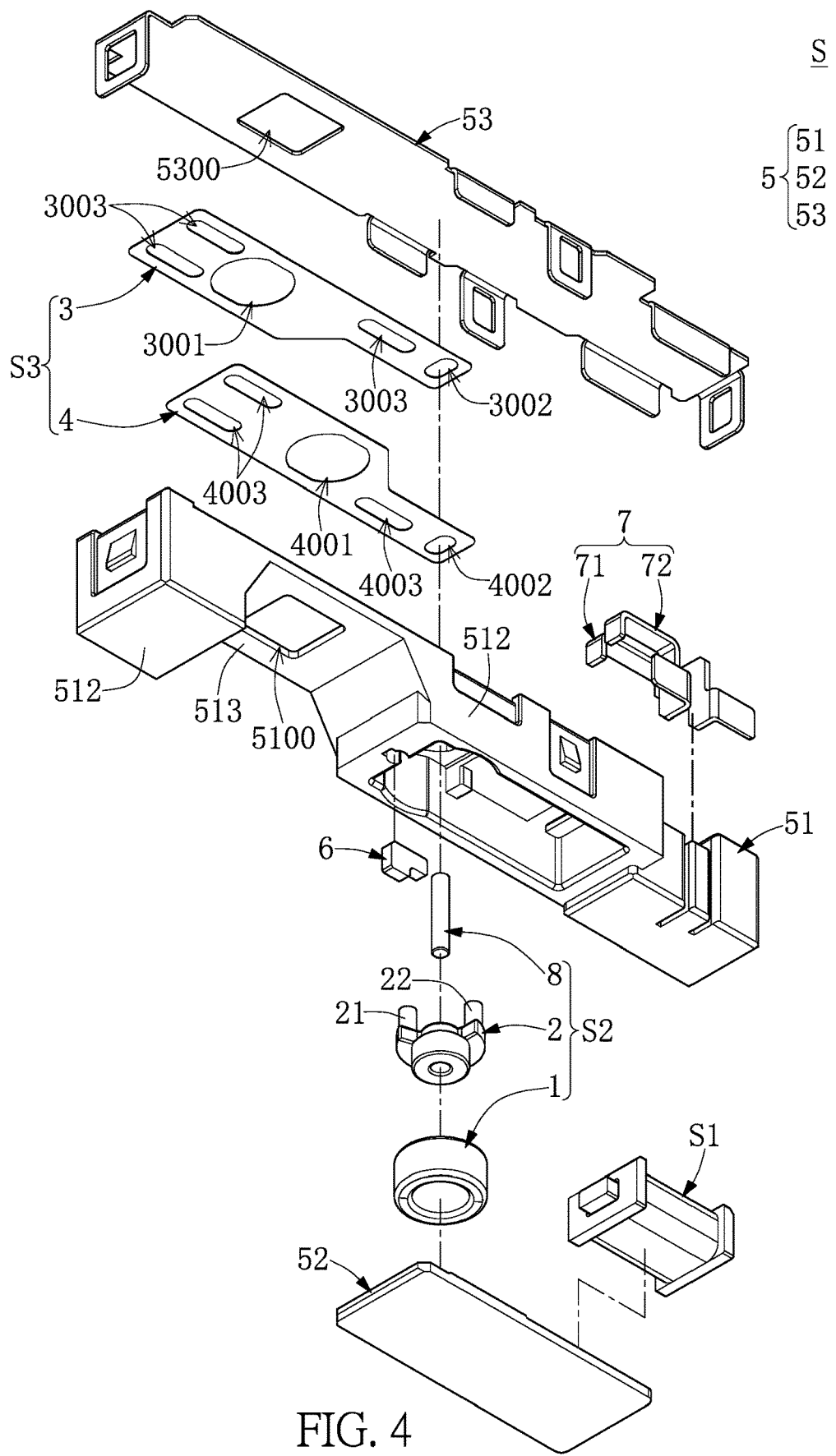
FIG. 4 is another exploded schematic view of the movable lens-shutting module according to the present disclosure.
Figure 5:
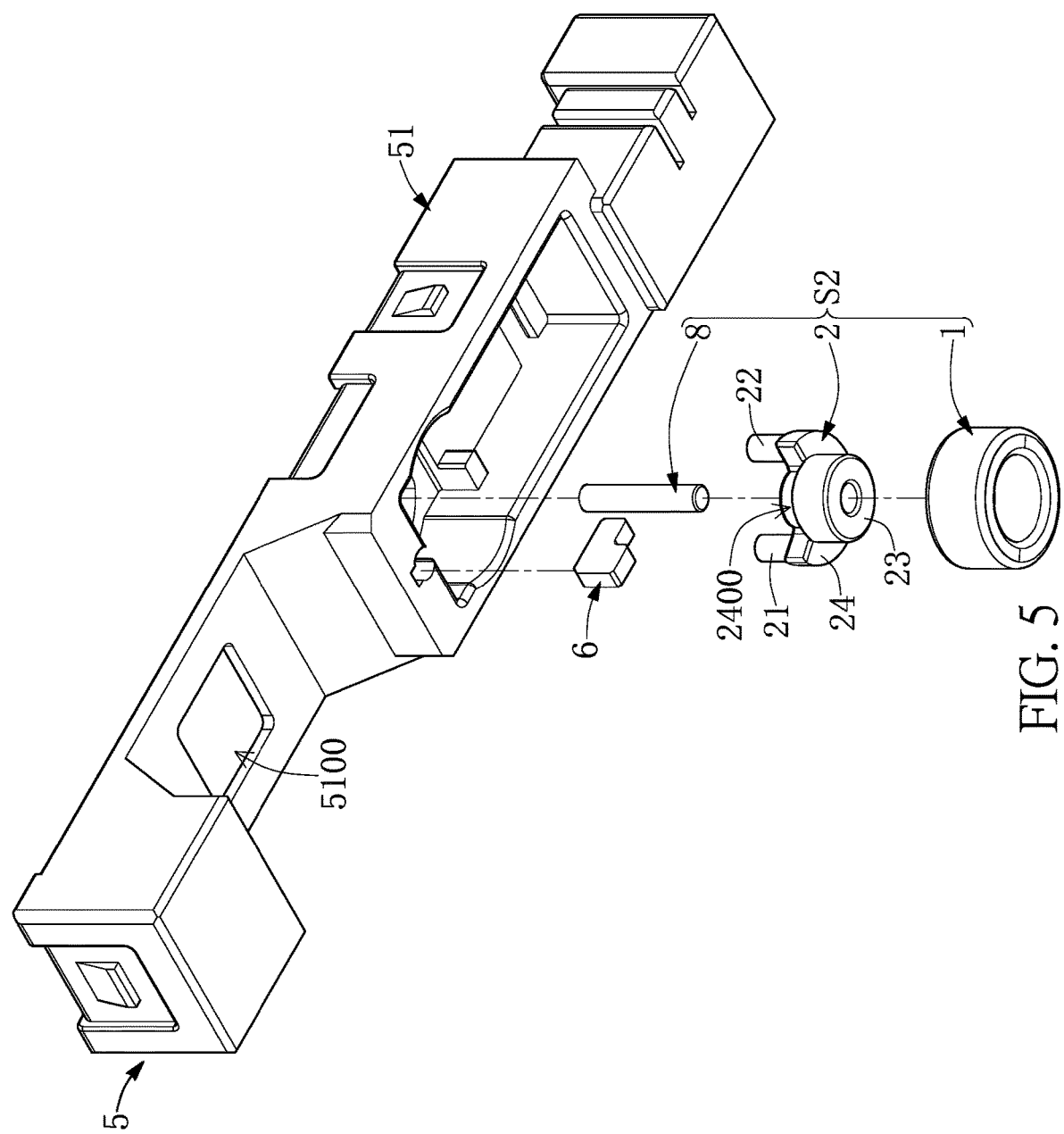
FIG. 5 is another partial exploded schematic view of the movable lens-shutting module according to the present disclosure.
Figure 6:
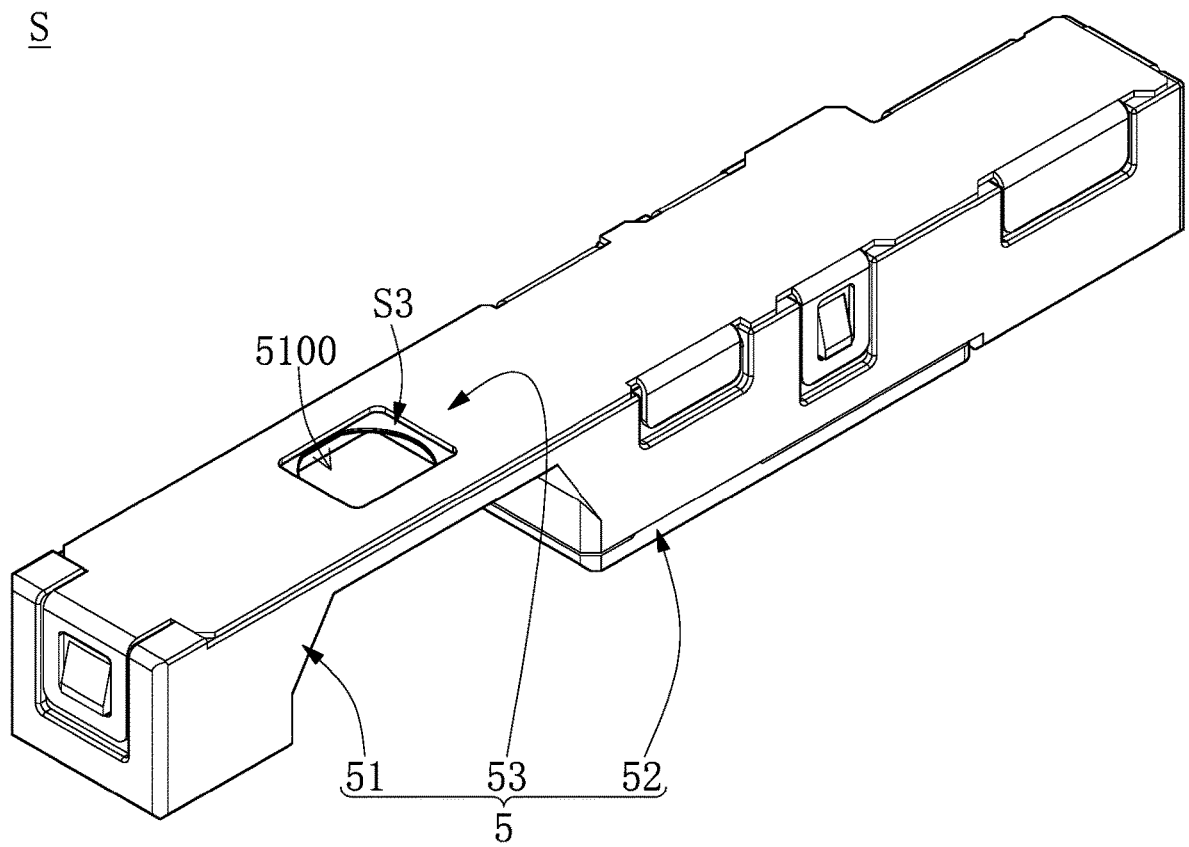
FIG. 6 is another assembled schematic view of the movable lens-shutting module according to the present disclosure.

Referring to FIG. 3, FIG. 6 and FIG. 10, it should be noted that the present disclosure further provides an image-capturing assembly Z including an image-capturing module M and a movable lens-shutting module S. In addition, the image-capturing module M includes a lens L that can be mated with the movable lens-shutting module S, and the movable lens-shutting module S includes a magnetic field generator S1, a rotatable driving assembly S2 and a movable shutter assembly S3. For example, the image-capturing module M with the lens L and the movable lens-shutting module S are disposed on a circuit substrate P, and the base body 51 includes two fixed portions 512 disposed on the circuit substrate P and a connecting portion 513 connected between the two fixed portions 512 and extending across the image-capturing module M. However, the aforementioned description is merely an example and is not meant to limit the scope of the present disclosure.

Figure 11:
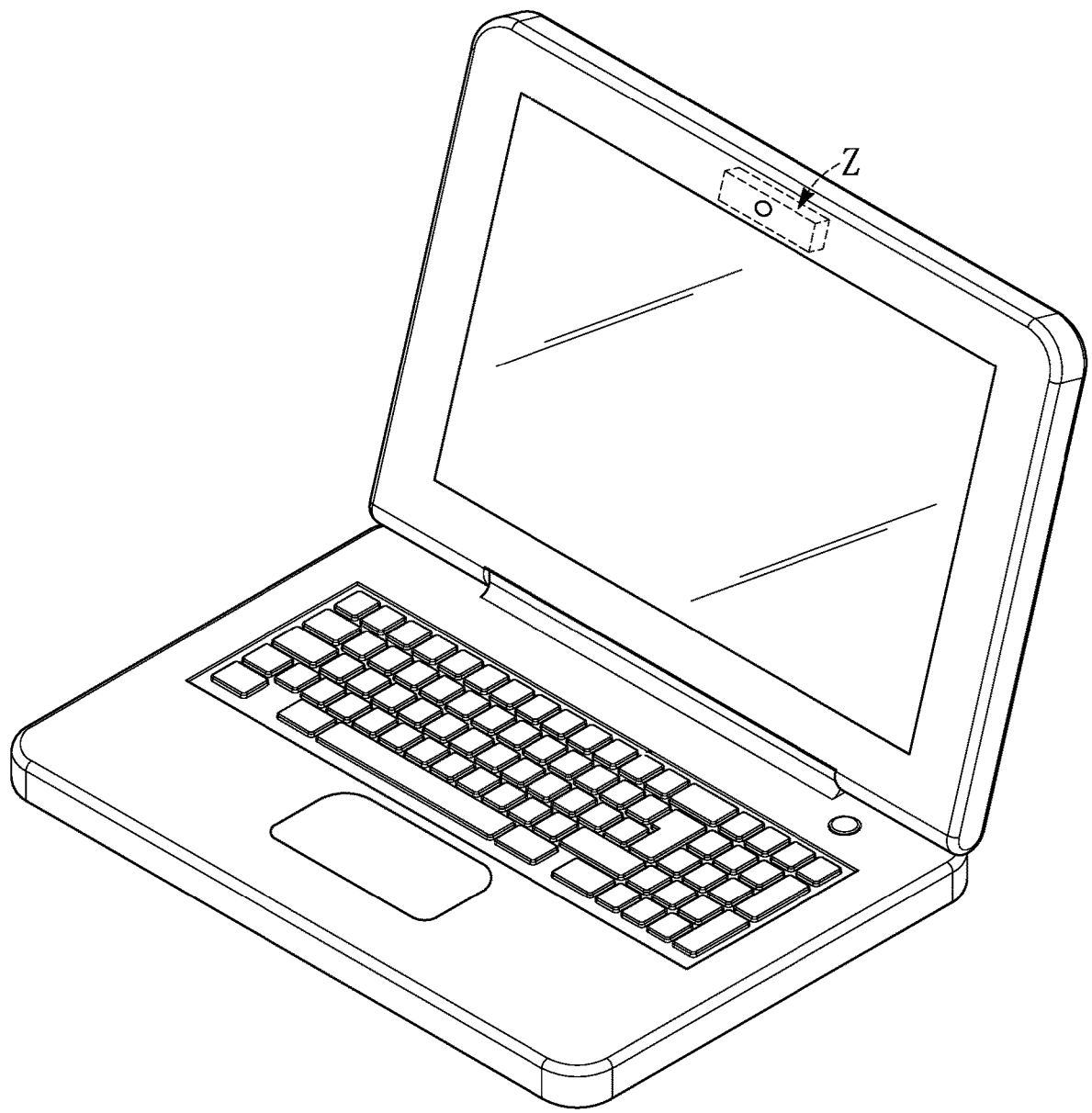
FIG. 11 is a perspective schematic view of a portable electronic device using the image-capturing assembly according to the present disclosure.

Referring to FIG. 10 and FIG. 11, it should be noted that the present disclosure further provides a portable electronic device including an image-capturing assembly Z disposed on a circuit substrate P, and the image-capturing assembly Z includes an image-capturing module M and a movable lens-shutting module S. In addition, the image-capturing module M includes a lens L that can be mated with the movable lens-shutting module S, and the movable lens-shutting module S includes a magnetic field generator S1, a rotatable driving assembly S2 and a movable shutter assembly S3. For example, the portable electronic device may be a desktop computer, a notebook computer or a tablet computer. However, the aforementioned description is merely an example and is not meant to limit the scope of the present disclosure.

In conclusion, by virtue of "the rotatable driving assembly S2 including a rotatable magnetic element 1 adjacent to the magnetic field generator S1 and a rotatable driving element 2 fixed on the rotatable magnetic element 1, and the rotatable driving element 2 including at least one driving rod (such as including a first driving rod 21 and a second driving rod 22" and "the movable shutter assembly S3 including at least one shutter element (such as including a first shutter element 3 and a second shutter element 4), and the at least one shutter element including a lens opening corresponding to a lens L and a receiving groove for receiving the at least one driving rod (for example, the first shutter element 3 includes a first lens opening 3001 corresponding to the lens L and a first receiving groove 3002 for receiving the first driving rod 21, and the second shutter element 4 includes a second lens opening 4001 corresponding to the first lens opening 3001 and a second receiving groove 4002 for receiving the second driving rod 22)", when the rotatable magnetic element 1 and the rotatable driving element 2 are concurrently moved by a magnetic force generated by the magnetic field generator S1, the at least one shutter element is moved in a linear direction by moving the at least one driving rod, so that the lens L can be exposed by the lens opening or can be blocked by the at least one shutter element (for example, the first shutter element 3 and the second shutter element 4 can be respectively moved in two different directions by respectively moving the first driving rod 21 and the second driving rod 22, so that the first lens opening 3001 and the second lens opening 4001 are in a strictly overlapping relationship with each other so as to expose the lens L by the first lens opening 3001 and the second lens opening 4001, or the first lens opening 3001 and the second lens opening 4001 are not in a strictly overlapping relationship with each other so as to cover the lens L by the movable shutter assembly S3).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A movable lens-shutting module, comprising:
   a magnetic field generator;
   a rotatable driving assembly including a rotatable magnetic element adjacent to the magnetic field generator and a rotatable driving element fixed on the rotatable magnetic element, wherein the rotatable driving element includes a first driving rod and a second driving rod; and
   a movable shutter assembly including a first shutter element and a second shutter element overlapping with each other, wherein the first shutter element includes a first lens opening corresponding to a lens and a first receiving groove for receiving the first driving rod, and the second shutter element includes a second lens opening corresponding to the first lens opening and a second receiving groove for receiving the second driving rod;
   wherein when the rotatable magnetic element and the rotatable driving element are concurrently moved by a magnetic force generated by the magnetic field generator, the first shutter element and the second shutter element are respectively moved in two different directions by respectively moving the first driving rod and the second driving rod, so that the first lens opening and the second lens opening are in a strictly overlapping relationship with each other so as to expose the lens by the first lens opening and the second lens opening, or the first lens opening and the second lens opening are not in a strictly overlapping relationship with each other so as to cover the lens by the movable shutter assembly;
   wherein the rotatable driving element includes a position-limiting portion, and the position-limiting portion has a curved guiding groove for movably receiving an elastic stopper, so that a rotating angle of the rotatable driving element is restricted by the elastic stopper.

2. The movable lens-shutting module according to claim 1, wherein when the rotatable magnetic element is moved by a magnetic repulsion force generated by the magnetic field generator, the rotatable driving element is counterclockwisely rotated at a predetermined angle by moving the rotatable magnetic element, and the first shutter element and the second shutter element are respectively straightly moved in two opposite directions by respectively moving the first driving rod and the second driving rod until the first lens opening of the first shutter element and the second lens opening of the second shutter element are in a strictly overlapping relationship with each other so as to expose the lens; wherein when the rotatable magnetic element is moved by a magnetic attraction force generated by the magnetic field generator, the rotatable driving element is clockwisely rotated at the predetermined angle by moving the rotatable magnetic element, and the first shutter element and the second shutter element are respectively straightly moved in two opposite directions by respectively moving the first driving rod and the second driving rod until the first lens opening of the first shutter element and the second lens opening of the second shutter element are not in a strictly overlapping relationship with each other so as to shade the lens by the first shutter element and the second shutter element.

3. The movable lens-shutting module according to claim 1, further comprising:
   a casing structure including a base body, a bottom cover detachably disposed on a bottom side of the base body, and a top cover detachably disposed on a top side of the base body, wherein the base body includes a base opening corresponding to the lens, and the top cover includes a cover opening corresponding to the base opening;
   the elastic stopper disposed inside the base body so as to limit a rotating angle of the rotatable driving element; and
   an electrode assembly disposed on the base body and partially covered by the top cover, wherein the electrode assembly includes a first conductive pin electrically connected to the magnetic field generator and a second conductive pin electrically connected to the magnetic field generator;
   wherein an image-capturing module with the lens is disposed on a circuit substrate, and the base body includes two fixed portions disposed on the circuit substrate, and a connecting portion connected between the two fixed portions and extending across the image-capturing module;
   wherein the magnetic field generator and the rotatable driving assembly are disposed inside the base body and completely covered by the bottom cover, and the movable shutter assembly is disposed on the top side of the base body and partially covered by the top cover;
   wherein the base body includes a plurality of guiding pins disposed on the top side of the base body, the first shutter element has a plurality of first linear guiding grooves, the second shutter element has a plurality of second linear guiding grooves, and each of the guiding pins concurrently passes through both the first linear guiding groove and the second linear guiding groove or passes through one of the first linear guiding groove and the second linear guiding groove;

wherein the base body includes a first curved guiding groove corresponding to the first receiving groove and a second curved guiding groove corresponding to the second receiving groove, the first curved guiding groove and the second curved guiding groove are symmetrical with respect to each other, and the first driving rod and the second driving rod are respectively movably disposed inside the first curved guiding groove and the second curved guiding groove.

4. The movable lens-shutting module according to claim 3, wherein the rotatable driving assembly includes a fixed shaft disposed between the base body and the bottom cover, the fixed shaft passes through the rotatable magnetic element and the rotatable driving element, and the rotatable magnetic element and the rotatable driving element are rotated relative to the fixed shaft by a predetermined angle; wherein the rotatable driving element includes a matching portion disposed inside the rotatable magnetic element for matching with the rotatable magnetic element, the position-limiting portion is disposed on the matching portion, and both the first driving rod and the second driving rod are disposed on the position-limiting portion.

5. A movable lens-shutting module, comprising:
a magnetic field generator;
a rotatable driving assembly including a rotatable magnetic element adjacent to the magnetic field generator and a rotatable driving element fixed on the rotatable magnetic element, wherein the rotatable driving element includes at least one driving rod; and
a movable shutter assembly including at least one shutter element, wherein the at least one shutter element includes a lens opening corresponding to a lens and a receiving groove for receiving the at least one driving rod;
wherein when the rotatable magnetic element and the rotatable driving element are concurrently moved by a magnetic force generated by the magnetic field generator, the at least one shutter element is moved in a linear direction by moving the at least one driving rod, so that the lens is exposed by the lens opening or is blocked by the at least one shutter element;
wherein the rotatable driving element includes a position-limiting portion, and the position-limiting portion has a curved guiding groove for movably receiving an elastic stopper, so that a rotating angle of the rotatable driving element is restricted by the elastic stopper.

6. The movable lens-shutting module according to claim 5, wherein when the rotatable magnetic element is moved by a magnetic repulsion force generated by the magnetic field generator, the rotatable driving element is counterclockwisely rotated at a predetermined angle by moving the rotatable magnetic element, and the at least one shutter element is straightly moved in the linear direction by moving the at least one driving rod until the lens is exposed by the lens opening of the at least one shutter element; wherein when the rotatable magnetic element is moved by a magnetic attraction force generated by the magnetic field generator, the rotatable driving element is clockwisely rotated at the predetermined angle by moving the rotatable magnetic element, and the at least one shutter element is straightly moved in the linear direction by moving the at least one driving rod until the lens is blocked by the at least one shutter element.

7. A portable electronic device comprising an image-capturing assembly that includes an image-capturing module and a movable lens-shutting module, the image-capturing module including a lens mated with the movable lens-shutting module, and the movable lens-shutting module comprising:
a magnetic field generator;
a rotatable driving assembly including a rotatable magnetic element adjacent to the magnetic field generator and a rotatable driving element fixed on the rotatable magnetic element, wherein the rotatable driving element includes a first driving rod and a second driving rod; and
a movable shutter assembly including a first shutter element and a second shutter element overlapping with each other, wherein the first shutter element includes a first lens opening corresponding to the lens and a first receiving groove for receiving the first driving rod, and the second shutter element includes a second lens opening corresponding to the first lens opening and a second receiving groove for receiving the second driving rod;
wherein when the rotatable magnetic element and the rotatable driving element are concurrently moved by a magnetic force generated by the magnetic field generator, the first shutter element and the second shutter element are respectively moved in two different directions by respectively moving the first driving rod and the second driving rod, so that the first lens opening and the second lens opening are in a strictly overlapping relationship with each other so as to expose the lens by the first lens opening and the second lens opening, or the first lens opening and the second lens opening are not in a strictly overlapping relationship with each other so as to cover the lens by the movable shutter assembly;
wherein the rotatable driving element includes a position-limiting portion, and the position-limiting portion has a curved guiding groove for movably receiving an elastic stopper, so that a rotating angle of the rotatable driving element is restricted by the elastic stopper.

8. The portable electronic device according to claim 7, wherein when the rotatable magnetic element is moved by a magnetic repulsion force generated by the magnetic field generator, the rotatable driving element is counterclockwisely rotated at a predetermined angle by moving the rotatable magnetic element, and the first shutter element and the second shutter element are respectively straightly moved in two opposite directions by respectively moving the first driving rod and the second driving rod until the first lens opening of the first shutter element and the second lens opening of the second shutter element are in a strictly overlapping relationship with each other so as to expose the lens; wherein when the rotatable magnetic element is moved by a magnetic attraction force generated by the magnetic field generator, the rotatable driving element is clockwisely rotated at the predetermined angle by moving the rotatable magnetic element, and the first shutter element and the second shutter element are respectively straightly moved in two opposite directions by respectively moving the first driving rod and the second driving rod until the first lens opening of the first shutter element and the second lens opening of the second shutter element are not in a strictly overlapping relationship with each other so as to shade the lens by the first shutter element and the second shutter element.

9. The portable electronic device according to claim 7, wherein the movable lens-shutting module further comprises:

a casing structure including a base body, a bottom cover detachably disposed on a bottom side of the base body, and a top cover detachably disposed on a top side of the base body, wherein the base body includes a base opening corresponding to the lens, and the top cover includes a cover opening corresponding to the base opening;

the elastic stopper disposed inside the base body so as to limit a rotating angle of the rotatable driving element; and an electrode assembly disposed on the base body and partially covered by the top cover, wherein the electrode assembly includes a first conductive pin electrically connected to the magnetic field generator and a second conductive pin electrically connected to the magnetic field generator;

wherein the image-capturing module with the lens is disposed on a circuit substrate, and the base body includes two fixed portions disposed on the circuit substrate and a connecting portion connected between the two fixed portions and extending across the image-capturing module;

wherein the magnetic field generator and the rotatable driving assembly are disposed inside the base body and completely covered by the bottom cover, and the movable shutter assembly is disposed on the top side of the base body and partially covered by the top cover;

wherein the base body includes a plurality of guiding pins disposed on the top side of the base body, the first shutter element has a plurality of first linear guiding grooves, the second shutter element has a plurality of second linear guiding grooves, and each of the guiding pins concurrently passes through both the first linear guiding groove and the second linear guiding groove or passes through one of the first linear guiding groove and the second linear guiding groove;

wherein the base body includes a first curved guiding groove corresponding to the first receiving groove and a second curved guiding groove corresponding to the second receiving groove, the first curved guiding groove and the second curved guiding groove are symmetrical with respect to each other, and the first driving rod and the second driving rod are respectively movably disposed inside the first curved guiding groove and the second curved guiding groove.

10. The portable electronic device according to claim 9, wherein the rotatable driving assembly includes a fixed shaft disposed between the base body and the bottom cover, the fixed shaft passes through the rotatable magnetic element and the rotatable driving element, and the rotatable magnetic element and the rotatable driving element are rotated relative to the fixed shaft by a predetermined angle; wherein the rotatable driving element includes a matching portion disposed inside the rotatable magnetic element for matching with the rotatable magnetic element, the position-limiting portion is disposed on the matching portion, and both the first driving rod and the second driving rod are disposed on the position-limiting portion.

* * * * *